(12) United States Patent
Ranzi et al.

(10) Patent No.: US 10,126,319 B2
(45) Date of Patent: Nov. 13, 2018

(54) PTO SHAFT MONITORING APPARATUS

(71) Applicant: CNH Industrial America LLC, New Holland, PA (US)

(72) Inventors: Marco Ranzi, Modena (IT); Valentina Accardi, Campogalliano (IT); Pier Paolo Prandini, San Giovanni Persiceto (IT)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/118,313

(22) PCT Filed: Feb. 12, 2015

(86) PCT No.: PCT/EP2015/052994
§ 371 (c)(1),
(2) Date: Aug. 11, 2016

(87) PCT Pub. No.: WO2015/121362
PCT Pub. Date: Aug. 20, 2015

(65) Prior Publication Data
US 2017/0176487 A1     Jun. 22, 2017

(30) Foreign Application Priority Data
Feb. 14, 2014   (IT) .............................. MO2014A0032

(51) Int. Cl.
*G01P 3/48*     (2006.01)
*G01D 5/14*     (2006.01)
*B60K 17/28*    (2006.01)

(52) U.S. Cl.
CPC ............... *G01P 3/48* (2013.01); *B60K 17/28* (2013.01); *G01D 5/14* (2013.01)

(58) Field of Classification Search
CPC .............. B60K 17/28; G01P 3/48; G01D 5/14
See application file for complete search history.

(56) References Cited

U.S. PATENT DOCUMENTS 6,038,936 A     3/2000   Butkovich et al.
6,129,187 A *  10/2000   Bellanger .............. B60K 17/28
                                               192/3.58
(Continued)

FOREIGN PATENT DOCUMENTS

EP         0842804          5/1998

OTHER PUBLICATIONS

PCT/EP2015/052994 International Search Report and Written Opinion dated Apr. 17, 2015.

*Primary Examiner* — Jermele M Hollington
*Assistant Examiner* — Suresh K Rajaputra
(74) *Attorney, Agent, or Firm* — Rickard K. DeMille; Rebecca L. Henkel

(57) ABSTRACT

A tractor includes a PTO shaft and a stub shaft selected from one of a group of different types of stub shafts that are configured to connect the PTO shaft to different types of implements to be driven by the PTO shaft. A circumferentially discontinuous tone wheel is provided on the PTO shaft, and a sensor is associated with the circumferentially discontinuous tone wheel to generate, in response to rotation of the circumferentially discontinuous tone wheel, an electrical signal having a waveform that repeats with a frequency indicative of a speed of rotation of the PTO shaft. Different formations are provided on the different types of stub shafts, and at least one formation of the different formations is detectable by the sensor and serves to modify the waveform in a manner indicative of one of the different types of stub shafts.

3 Claims, 2 Drawing Sheets

(56) References Cited

U.S. PATENT DOCUMENTS

| | | | |
|---|---|---|---|
| 8,206,055 B2* | 6/2012 | Schafer | F16D 1/06 403/359.3 |
| 2003/0122539 A1* | 7/2003 | Heimann, Jr. | G01P 3/443 324/173 |
| 2004/0061493 A1* | 4/2004 | Fishburn | G01P 3/443 324/173 |
| 2005/0035758 A1* | 2/2005 | Waszkowski | B60T 8/171 324/207.25 |
| 2006/0128524 A1 | 6/2006 | Busch | |
| 2009/0018727 A1 | 1/2009 | Busch et al. | |

* cited by examiner

PTO SHAFT MONITORING APPARATUS

CROSS REFERENCE TO RELATED APPLICATIONS

This application is a national stage of PCT Application No. PCT/EP2015/052994, entitled "PTO SHAFT MONITORING APPARATUS", filed on Feb. 12, 2015, which claims priority from and the benefit of Italian Patent Application Serial No. MO2014A000032, filed on Feb. 14, 2014. Each of the foregoing applications is hereby incorporated by reference in its entirety.

FIELD OF THE INVENTION

The present invention relates to a tractor having a PTO shaft and different types of stub shaft for connecting the PTO shaft to different types of implement to be driven by the PTO shaft. In particular the invention is concerned with monitoring the type of stub shaft fitted to the power take off (PTO) shaft of a tractor to ensure that the PTO shaft is driven at a speed appropriate to the driven implement.

BACKGROUND OF THE INVENTION

Implements to be powered by the PTO shaft of a tractor are commonly designed to operate at only one or other of two speeds, namely 540 RPM and 1000 RPM. Different spline geometries are used on the input shafts of different implements to ensure that they are not driven at the incorrect speed.

Some tractors have a PTO output shaft that will only fit one type of implement. However, tractors of sufficient power to drive any type of implement have interchangeable stub shafts connected to the engine driven PTO shaft. The stub shafts have different spline geometries on their output end to allow coupling to either type of implement.

Because the tractor PTO shaft can be driven at different speeds, there is a risk of the speed being set incorrectly for a given implement. For this reason, there is a need to be able to monitor the type of stub shaft mounted on the PTO shaft so that the PTO shaft can only be operated at the speed appropriate for the driven implement.

EP 0 842 804, which is believed to represent the closest prior art to the present invention, discloses a system in which toothed wheels associated with stationary sensors are fitted to the input shaft of the PTO gearbox and to the PTO stub shaft, the toothed wheels of different stub shafts having different numbers of teeth. By measuring the ratio of the pulses produced by the two sensors, it is possible to ascertain the type of stub shaft fitted to the PTO shaft.

SUMMARY OF THE INVENTION

According to the present invention, there is provided a tractor having a PTO shaft and different types of stub shaft for connecting the PTO shaft to different types of implement to be driven by the PTO shaft, wherein a circumferentially discontinuous tone wheel is provided on the PTO shaft and a sensor is associated with the tone wheel for generating, in response to rotation of the tone wheel, an electrical signal having a waveform that repeats with a frequency indicative of the speed of rotation of the PTO shaft, characterised in that different formations are provided on different stub shaft types, and the formation on at least one type of stub shaft is detectable by the sensor associated with the tone wheel and serves to modify the repeating waveform generated by the sensor in a manner indicative of the type of the stub shaft.

The invention offers the advantage that it allows the type of stub shaft to be determined without the use of additional sensors and tone wheels.

The discontinuities may be in any physical property of the tone wheel detectable by means of a suitable sensor. If the tone wheel is in the form of a metallic toothed wheel, the teeth may be detected by means of an inductive sensor. The wheel may be magnetised and the sensor may be a Hall effect sensor. Many such sensors and tone wheels are well known in the art and the present invention is not restricted to any one.

In a preferred embodiment of the invention, the tone wheel is a toothed wheel having regularly spaced teeth but with at least one tooth omitted and replaced by a notch or groove. The formation on the stub shaft many in this case comprise at least one tooth capable of projecting through the groove to be detected by the same sensor as the teeth of the tone wheel.

If there are only two possible types of stub shaft, then a single missing tooth can be used to identify the stub shaft, the two possible states being the presence or absence of a tooth in the repeating waveform. To identify more that two types of stub shaft, the tone wheel may have two or more missing teeth and the stub shafts may have different formations to replace different ones of the missing teeth.

While it is preferred for the formations on the stub shaft to line in the same axial place as the teeth of the tone wheel, this is not essential, as long as the same sensor is configured to detect both the teeth of the tone wheel and the formations on the stub shafts.

By providing teeth on a stub shaft that need to be circumferentially aligned with grooves in the axial end face of the PTO shaft before the stub shaft can be locked into place relative to the PTO shaft, it is possible to ensure that the teeth of the stub shafts are always in the correct axial plane to be detected by the sensor of the tone wheel.

BRIEF DESCRIPTION OF THE DRAWINGS

The invention will now be described further, by way of example, with reference to the accompanying drawings, in which.

DETAILED DESCRIPTION OF THE DRAWINGS

Figure 1:
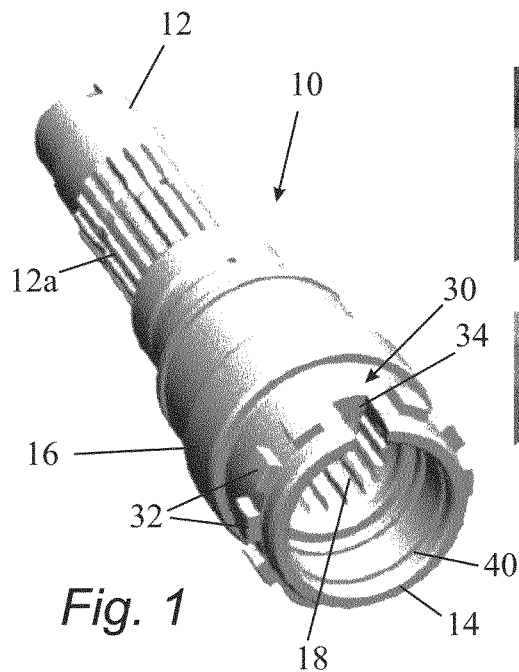
FIG. 1 is a perspective view of a PTO shaft of a tractor embodying the invention.

The PTO shaft 10 in FIG. 1 has an inner end 12 mounted within a tractor gearbox and an outer end 14 that is accessible to the tractor operator. A bearing race 16 by means of which the PTO shaft 10 is supported for rotation separates the inner and outer ends of the PTO shaft.

The inner end 12 of the PTO shaft has a toothed region 12a meshing with cogs (not shown) that are in turn driven by the tractor engine by way of a clutch and a change speed mechanism to allow the PTO shaft to be rotated at either 540 RPM or 1000 RPM while the engine is running at the same fixed engine speed.

Figure 2:
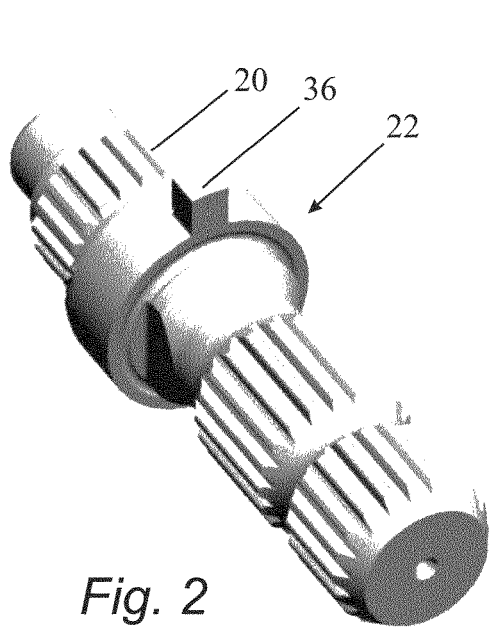
FIG. 2 is a perspective view of a first stub shaft having twenty splines on its output end.
Figure 3:
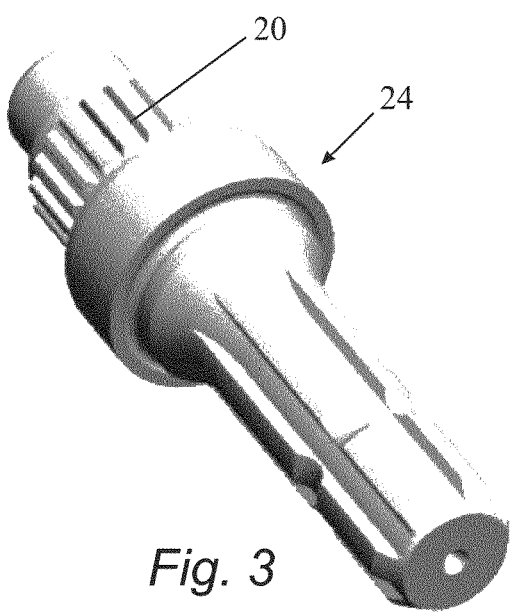
FIG. 3 is a perspective view of a second stub shaft with six splines on its output end.

The outer end 14 of the PTO shaft 10 has a splined socket 18 to receive splines 20 on the input ends of stub shafts 22 and 24 shown in FIGS. 2 and 3, respectively. The splines 20 on the input ends of different stub shafts 22, 24 are all identical, but each stub shaft has a different spline geometry on its output end, that is to say its end coupled during use to the driven implement. In particular, the stub shaft 22 of FIG. 2 has twenty splines on its output end to suit implements intended to be driven at 1000 RPM, while the shaft 24 in FIG. 3 has only six splines at its output end and is intended for implements to be driven at 540 RPM.

The outer end 14 of the PTO shaft 10 also has a tone wheel 30 comprising a ring with eleven projecting teeth 32. The teeth are spaced apart by 30° leaving space for one missing tooth. In the place of the missing tooth, an axially extending groove 34 is formed in the end of the PTO shaft 10. A stationary sensor (not shown) is mounted on the tractor to detect the teeth 32 of the tone wheel as the PTO shaft rotates. The sensor may be a Hall effect sensor, if the tone wheel is magnetised or an inductive sensor is the teeth are ferromagnetic. Such sensors are well known and need not therefore be described within the present context.

Figure 4:
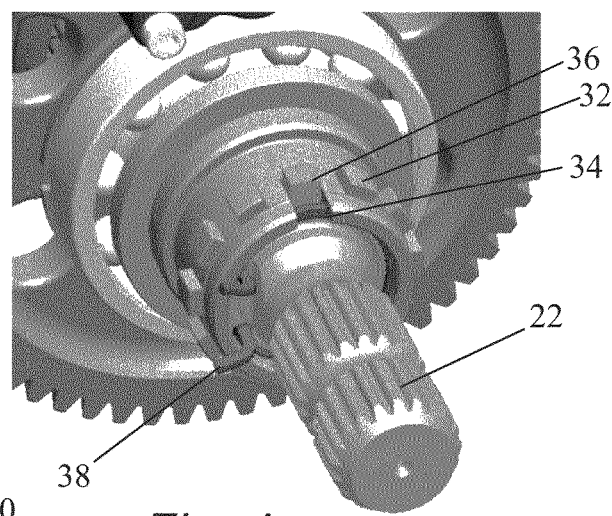
FIG. 4 shows the stub shaft of FIG. 2 when assembled onto the PTO shaft of FIG. 1.

FIG. 4 shows the stub shaft 22 when fitted to the PTO shaft of FIG. 1. The stub shaft 22 has a single tooth 36 which is received within the groove 34 to line up with the teeth 32 of the tone wheel 30. The stub shaft 22 is held in place by means of a circlip 38 that can only be inserted into an annular groove 40 in the PTO shaft 10 when the tooth 36 has been correctly aligned with the axially extending groove 34. The stub shaft 24 on the other hand, does not have a projecting tooth and can therefore be fitted to the PTO shaft 10 in any orientation.

Figure 5:
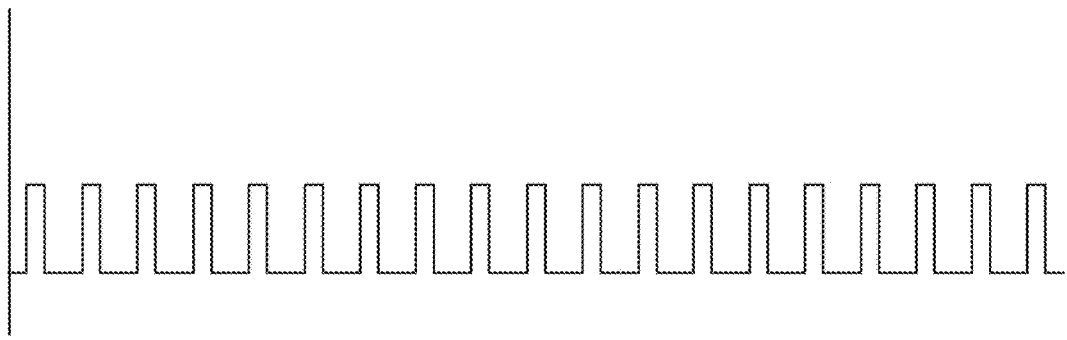
FIG. 5 is a diagram of the signal produced by a sensor associated with the tone wheel of the PTO shaft in FIG. 1 when fitted with the stub shaft of FIG. 2.

When the shaft 22 is fitted to the PTO shaft 10, the sensor associated with the tone wheel 30 will see a complete set of twelve teeth evenly distributed about the circumference of the PTO shaft 10 and will generate, after suitable processing, a waveform as shown in FIG. 5. In this waveform, the pulses are uniformly spaced and have a frequency indicative of the speed of rotation of the PTO shaft, the time taken for one rotation being twelve times the duration between corresponding edges of consecutive pulses in the case of the illustrated tone wheel.

Figure 6:
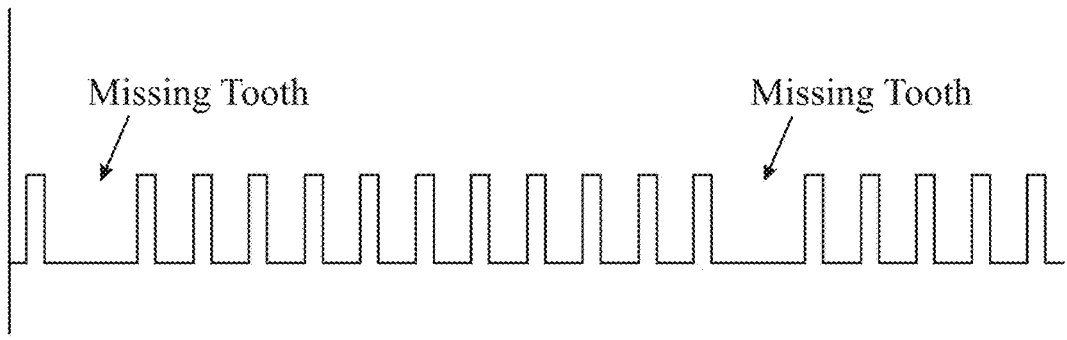
FIG. 6 is a diagram of the signal produced by a sensor associated with the tone wheel of the PTO shaft in FIG. 1 when fitted with the stub shaft of FIG. 3.

However, when the stub shaft 24 is fitted to the PTO shaft 10, the waveform generated by the tone wheel sensor will be as shown in FIG. 6. In this case, the waveform once again contains evenly spaced pulses save that every twelfth pulse is missing. The processing circuit connected to the sensor can still compute the speed of rotation of the PTO shaft from the shorter time interval between consecutive pulses but the omission of every twelfth pulses will indicate that the stub shaft 24 has been fitted to the PTO shaft and that the PTO shaft should therefore only be operated at 540 RPM.

Currently, only three types of connector are used on PTO shafts, with six, twenty and twenty one splines respectively. Connectors with twenty and twenty one splines are both intended for operation at 1000 RPM and stub shafts with such geometries are both provided with a tooth to fit into the groove 24 and thereby replace the missing tooth in the tone wheel.

A single missing tooth can only be used to distinguish between two different types of stub shaft. Should the need ever arise to be able to distinguish between more than two types, then it is only necessary to provide more than one missing tooth and different tooth combinations on the different stub shafts resulting in various different waveforms detectable by the tone wheel sensor.

The invention claimed is:

1. A tractor having a PTO shaft and a stub shaft selected from one of a plurality of different types of stub shafts that are configured to connect the PTO shaft to different types of implements to be driven by the PTO shaft;
   the PTO shaft comprising:
      a tone wheel comprising a circumferentially discontinuous ring of a plurality of teeth and a groove defined between two adjacent teeth of the plurality of teeth, wherein the groove is configured to receive a tooth of at least one of the stub shafts, and
      a sensor associated with the circumferentially discontinuous tone wheel configured to:
         detect both a rotation of the circumferentially discontinuous tone wheel and whether a tooth of one of the stub shafts is positioned within the groove of the tone wheel:
         generate, in response to rotation of the circumferentially discontinuous tone wheel and whether a tooth of one of the stub shafts is positioned within the groove of the tone wheel, an electrical signal having a waveform that identifies a speed of rotation of the PTO shaft and which of the different types of stub shafts is connected to the PTO shaft.

2. The tractor as claimed in claim 1, wherein the plurality of teeth of the circumferentially discontinuous tone wheel are regularly spaced teeth with at least one omitted tooth corresponding to the groove.

3. The tractor as claimed in claim 1, wherein when the stub shaft is fitted to the PTO shaft, the tooth of the stub shaft and the teeth of the circumferentially discontinuous tone wheel lie in a common axial position.

* * * * *